March 16, 1965   R. A. HANN   3,173,460
PROCESS FOR REDUCING SPRINGBACK IN PRESSED WOOD PRODUCTS
Filed Aug. 2, 1962
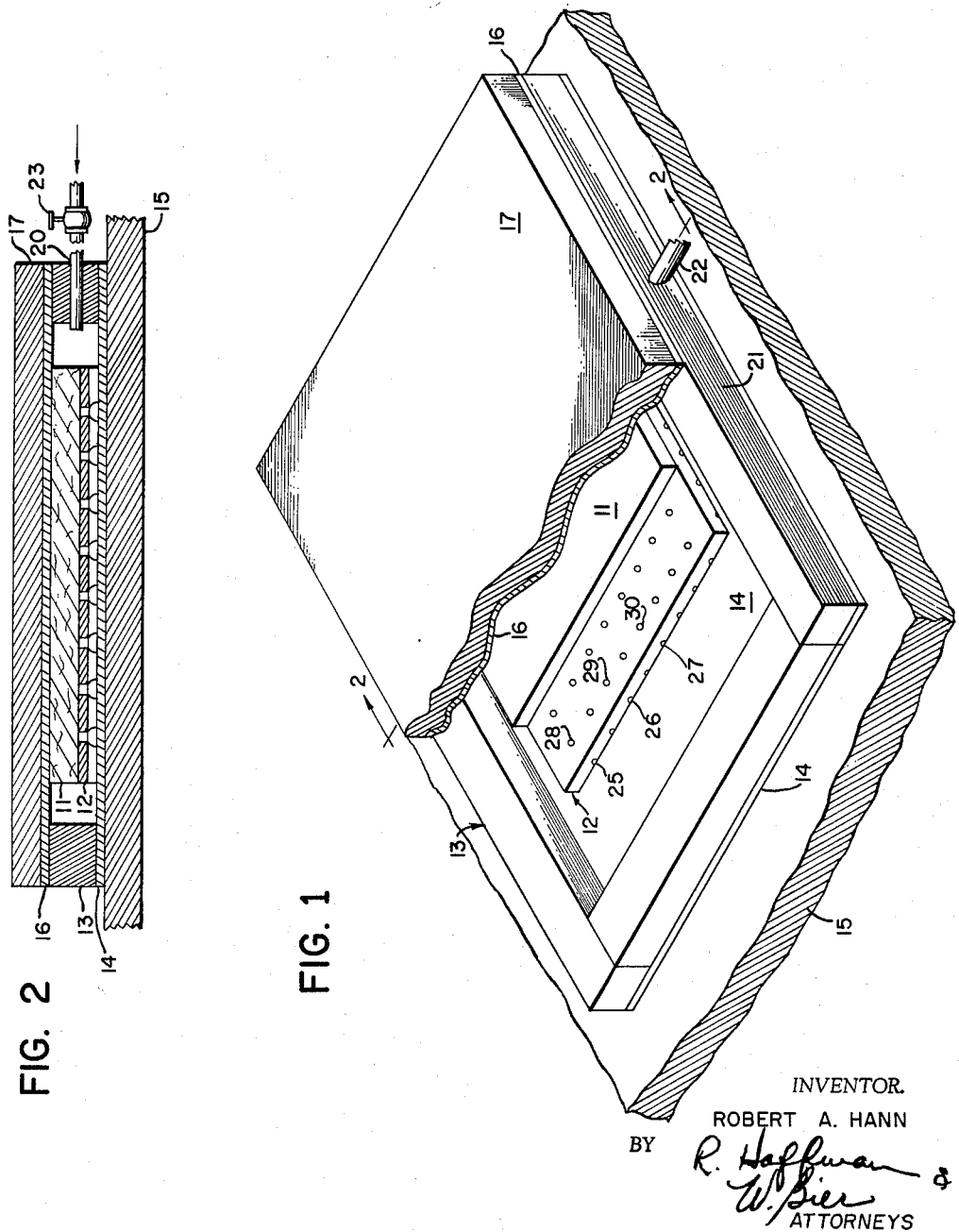
INVENTOR.
ROBERT A. HANN
BY
ATTORNEYS Patent 3,173,460 — "Process for Reducing Springback in Pressed Wood Products"

United States Patent Office 3,173,460
Patented Mar. 16, 1965

3,173,460
PROCESS FOR REDUCING SPRINGBACK IN PRESSED WOOD PRODUCTS
Robert A. Hann, Black Earth, Wis., assignor to the United States of America as represented by the Secretary of Agriculture
Filed Aug. 2, 1962, Ser. No. 214,434
3 Claims. (Cl. 144—309)
(Granted under Title 35, U.S. Code (1952), sec. 266)

A non-exclusive, irrevocable, royalty-free license in the invention herein described throughout the world for all purposes of the United States Government, with the power to grant sublicenses for such purposes, is hereby granted to the Government of the United States of America.

This invention relates to a process for reducing the change in the thickness of pressed wood products, particularly particle board, as the moisture content thereof changes, by reducing the amount of springback, and has among its objects the provision of such a process which is simple, economical, and extends the utility of such pressed wood products to exterior applications. Other objects will be apparent from the description of the invention.

Wood particle boards are relatively dense boards, usually in panel form, made from dry wood particles that have been coated with a binder and formed and bonded to shape by pressure and heat. They are known by several names, including chipboard, chipcore, core board, synthetic lumber, and composition board. The boards can be made from almost any type of wood waste and of any species.

Particle board is used in furniture, table tops, doors, underlayment, and wall paneling. Core stock for furniture represents the largest single use. At present, uses are limited to interior applications. As its structural and engineering properties are developed and improved, a large outlet for particle board may develop in the construction field.

There are two major processes of making particle boards: (1) pressing the boards flatwise in multiple-opening hot presses and (2) continuously extruding the boards through a hot extrusion die. Boards made by the first method are commonly called flat-pressed boards, and those made by the second method are called extruded boards. At present, flat-pressed boards made in a range of thickness between $\frac{1}{10}$ and $1\frac{1}{2}$ inches account for about 85 percent of the production, with extruded boards $\frac{1}{2}$ to 2 inches thick supplying the remainder.

The following sequence of operations applies to the production of boards by either process:
(1) Hogging, grinding, hammermilling, or machining the raw wood material to the desired particle size and shape.
(2) Drying the particles to a uniform, predetermined moisture content and, in most cases screening out the fines (for example, that material which passes through a 16-mesh screen).
(3) Adding controlled amounts of binder and other additives by spraying or other means, mixing the ingredients thoroughly. At the present time, urea resins are the most common binder, although phenol resins are also used to some extent.
(4) Flat pressing (preceded by mat formation) or extruding the boards under controlled heat and pressure to a density slightly greater than that of the species in the particles.
(5) Cooling, trimming, and equalizing the moisture content in the formed boards.
(6) Sanding, or sometimes planing, the equalized boards to the proper exact thickness.

In such important properties as strength, stiffness, and dimensional stability, most flat-pressed boards are better and more uniform across their width and length than are extruded boards. Flat-pressed boards made from well-cut flakes have initial dry properties that approach those of plywood, although usually at some slight increase in weight. Extruded boards have properties in the widthwise direction (across the extruder) somewhat similar to those of flat-pressed boards; however, the properties in the extrusion direction are relatively low. For this reason, extruded boards are almost universally crossbanded with straight-grain veneer sheets and used primarily for core stock. Flat-pressed boards are less stable in thickness than extruded boards.

The primary objection to the use of phenolic-resin bonded particle board in exterior applications is the excessive thickness swelling that occurs during exposure. Work on the exterior durability of particle board has shown that wax, lower density, and additional binder will reduce the amount of thickness swell during exterior exposure somewhat, but they will not prevent the inherent thickness swell that will eventually occur. The inventive process disclosed herein considerably reduces this thickness swelling and increases the utility of particle board in exterior applications.

It also has been found that wood will quickly set in a deformed shape due to plastic flow at temperatures of 250° F. and higher if the moisture content of the wood is relatively high. The exact temperature and moisture content where the plastic flow begins to be effective has not been determined precisely. It is known that wood at 212° F. and wood that is dry (e.g., below 6 percent content) does not readily set due to plastic flow and the deformation that occurs in dry or cold wood recovers when moisture content is increased, the amount of recovery depending on the amount of moisture content increase.

Particle board is normally compressed during fabrication at a temperature which is sufficient to cause plastic flow of the wood, but the moisture content of the particles is, in almost all cases, below the required moisture content for plastic flow. Even if green wood flakes are used to manufacture particle board, the plastic flow would not occur during conventional fabrication because the particles would not get much above 212° F. until most of the moisture in the wood was gone. This is the case because pressing of particle boards is normally done at atmospheric pressure so only low steam pressures build up in the board. The particle board is either dry or relatively cool when it is compressed. Therefore the compression of the wood that occurs during the pressing of the particle board is a mechanical crushing action and the deformation will largely recover upon soaking, boiling, or exterior exposure. The pressures occurring in the process of this invention, however, do not produce the same mechanical crushing action but cause plastic flow of the wood particles, although a small degree of mechanical crushing remains. Particle boards subjected to the process of the invention do not expand to any significant extent upon soaking, boiling, or exterior exposure. Thus the process reduces springback.

In general, according to the process of the invention, the particle board is exposed to steam at a high pressure while the board is restrained in a restraining zone to prevent thickness swelling. As a result, the board particles adsorb moisture and heat, swell internally and achieve a new, stable dimension in the pressed thickness, the temperature and moisture content of the pressed wood product being sufficiently high to promote plastic flow. The exposure of the particle board to high-pressure steam could be done either at the time of pressing or in a post-pressing operation. The inclusion of steam or water in the flakes during the pressing operation, however, could cause a high concentration of moisture to develop at the center of the board, resulting in an internal steam pressure that would cause the board to fail when the press was opened. This phenomenon is seen quite often in laboratory particle board manufacture. Post-pressing exposure, therefore, has more obvious practical application.

In carrying out the inventive process, therefore, as a post-pressing operation, the pressed wood product as, for example, particle board, after being removed from the hot press, is restrained to prevent thickness swelling and, while so restrained, exposed to steam at a pressure of about from 30 to 100 pounds per square inch and a temperature of about from 275° F. to 340° F. for about from 1 to 10 minutes, a relative vapor pressure of at least 90% being maintained during this period, thereby to achieve a moisture content in the resulting treated wood product of at least 90% of the fiber saturation point. This is a critical minimum moisture content to be obtained in the treated wood product in order to achieve the desired reduction in springback.

The thus treated wood product is thereafter dried to a moisture content of less than about 4% and, if desired, to a zero moisture content by ovendrying.

In the annexed drawing which illustrates an example of an apparatus for carrying out the inventive process, FIG. 1 is a perspective plan view with parts broken away; and FIG. 2 is a view on the line 2—2 of FIG. 1.

In utilizing the apparatus illustrated in the drawing, the inventive process is carried out by placing the pressed wood product, as, for example, particle board 11, on a ventilated caul 12 and both are positioned within a steel frame 13 resting on a gasket 14 which underlies the frame, the entire assembly being supported on a platen 15 shown partially broken away.

A second gasket 16 is placed over frame 13 and another platen 17 is used to cover gasket 16. Frame 13 is of a thickness so selected that, when the apparatus is completely assembled, particle board 11 and caul 12 will be restrained between the faces of gaskets 14 and 16 and the board will thus be prevented from swelling.

An opening 20 in wall 21 of the frame communicates through pipe 22, shown partially broken away, with a source of steam (not shown), the introduction of which into contact with the particle board 11 being controlled by a pressure release valve 23.

To aid in transferring the steam into and out of the particle board, the caul 12 is provided with a plurality of grooves which run along the bottom of the caul thus allowing steam to enter at both ends of the caul. Three of such grooves are indicated by the numerals 25, 26, and 27. Each of these grooves communicates with a ventilating aperture in and perpendicular to the surface of the caul thus providing effective ventilation of the caul. Three such ventilating apertures are indicated by the numerals 28, 29, and 30, and are shown communicating with grooves 25, 26, and 27, respectively.

After the apparatus has been assembled as described above, valve 23 is opened to admit steam at a pressure of about from 30 to 100 pounds per square inch and at a temperature of about from 275° F. to 340° F. for about from 1 to 10 minutes, a relative vapor pressure of at least 90% being obtained during this period, whereby the moisture content of the treated particle board reaches at least 90% of the fiber saturation point.

The optimum conditions for carrying out the process in the above apparatus are a steam pressure of about 75 pounds per square inch, a temperature of about 320° F., and a time of exposure of the board to the steam for about 2 minutes.

After the treatment period, the steam pressure is reduced to atmospheric by opening the pressure release valve 23 and the particle board then removed and dried to a moisture content of less than about 4%. It may be reduced to a moisture content of zero by ovendrying, if desired.

As an alternative to the use of the piped-in steam, as described above, the steam may be generated from free water applied to the particle board and heated by the platens 15 and 17 (while the platens are closed) or it may be introduced from an external source through an opening other than through the pressure release valve 23 described above.

Examples of applications of the process and comparison of treated specimens with untreated specimens appear in the following table. In these examples, four Ohia particle boards, having densities of 47 or 57 lbs. per cubic ft., were used. Two boards contained 3 percent phenolic-resin binder and two contained 6 percent phenolic-resin binder. The portions of the boards that were to be treated were placed in a steel frame with 50 grams of water and sealed in a hot press. The conditions of the treatment are shown in the table. After the boards were treated by this procedure, they were ovendried, that is, reduced to a zero moisture content, along with matching control specimens, and then sections were cut from each specimen and either soaked in water or boiled for 3 hours. In all cases the treated specimens exhibited much less springback than the nontreated specimens. After the boiled specimens were ovendried, the amount of springback was computed based on the ovendry dimension before boiling. It is apparent from the data in the table that the treatment has greatly reduced the springback of these particle boards.

| Trial No. | Board No. | Density, Lb. per cu. ft. | Resin [1] content, Percent | Treatment | | | | Springback [2] | |
|---|---|---|---|---|---|---|---|---|---|
| | | | | Platen temperature, °F. | Steam pressure, p.s.i. | Steam temperature, °F. | Time,[3] Min. | Control, Percent | Treated, Percent |
| 1 | 10-3B | 57 | 6 | 300 | 30 | 275 | 5 | 21 | 8 |
| 2 | 10-3B | 57 | 6 | 350 | 60 | 307 | 10 | 21 | 4 |
| 3 | 10-2 | 58 | 3 | 400 | 75 | 320 | 10 | 37 | 1 |
| 4 | 10-3 | 47 | 6 | 400 | 75 | 320 | 1 | 12 | 5 |
| 5 | 9-29 | 47 | 3 | 400 | 75 | 320 | 1 | 29 | 12 |

[1] Phenolic-resin binder.
[2] Springback (percent)=100 [thickness after 3 hr. boil and ovendry—ovendry thickness before boiling/ovendry thickness before boiling].
[3] Time at maximum steam pressure.

What is claimed is:

1. A process of reducing springback in a pressed wood product having surfaces which comprises maintaining substantially the same product thickness by interposing said surfaces between restraining means which are stationary relative to the swelling of said pressed wood product, exposing the thus restrained wood product to steam at a pressure of about from 30 to 100 pounds per square inch and at a temperature of about from 275° to 340° F. for about 1 to 10 minutes while maintaining a relative vapor pressure of at least 90% during this period to cause the particles of the pressed wood product to adsorb moisture and heat, thereby causing internal swelling and the promotion of plastic flow, to achieve a moisture content in the resulting product of at least 90% of the fiber saturation point, and drying the resulting treated product.

2. The process of claim 1 wherein the steam is introduced into the restraining zone from an external source.

3. The process of claim 1 wherein the steam is generated from free water applied to the pressed wood product prior to its placement in the restraining zone.

References Cited by the Examiner

UNITED STATES PATENTS

| Re. 22,071 | 4/42 | Nevin | 144—309 XR |
| 2,453,679 | 11/48 | Stamm et al. | 144—327 XR |
| 2,666,463 | 1/54 | Heritage | 144—327 |

LESTER M. SWINGLE, *Primary Examiner.*

EARL EMSHWILLER, WILLIAM W. DYER, JR., *Examiners.*